United States Patent
Park et al.

(10) Patent No.: US 8,514,821 B2
(45) Date of Patent: Aug. 20, 2013

(54) CENTRAL CONTROLLER AND METHODS FOR INTERFERENCE MITIGATION IN TDMA NETWORKS USING RANDOMLY ALLOCATED SERVICE PERIODS

(75) Inventors: Minyoung Park, Portland, OR (US); Xiaohong Gong, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 606 days.

(21) Appl. No.: 12/346,431

(22) Filed: Dec. 30, 2008

(65) Prior Publication Data

US 2010/0165955 A1 Jul. 1, 2010

(51) Int. Cl.
| | |
|---|---|
| H04W 4/00 | (2009.01) |
| H04J 3/00 | (2006.01) |
| H04J 3/16 | (2006.01) |
| H04B 7/212 | (2006.01) |
| H04L 1/00 | (2006.01) |
| H04L 12/26 | (2006.01) |

(52) U.S. Cl.
USPC ........... 370/337; 370/230; 370/328; 370/329; 370/336; 370/338; 370/345; 370/346; 370/347; 370/348

(58) Field of Classification Search
None
See application file for complete search history.

(56) References Cited

U.S. PATENT DOCUMENTS

| 6,958,677 | B1 * | 10/2005 | Carter | 340/10.1 |
|---|---|---|---|---|
| 7,408,914 | B2 * | 8/2008 | Krishnan et al. | 370/345 |
| 2004/0058686 | A1 * | 3/2004 | Odman | 455/450 |
| 2004/0159213 | A1 * | 8/2004 | Eruera | 84/609 |
| 2006/0067280 | A1 * | 3/2006 | Howard et al. | 370/337 |
| 2007/0280237 | A1 * | 12/2007 | Shin et al. | 370/390 |

FOREIGN PATENT DOCUMENTS

| JP | 2007518364 A | 7/2007 |
|---|---|---|
| JP | 2009539301 A | 11/2009 |
| JP | 2000515698 A | 11/2011 |
| WO | WO-9804055 A1 | 1/1998 |
| WO | WO-2007142459 A1 | 12/2007 |

OTHER PUBLICATIONS

"Japanese Application Serial No. 2009-294991, Office Action mailed Nov. 15, 2011", 5 pgs.
"Japanese Application Serial No. 2009-294991, Office Action Response filed Mar. 2, 2012", 12 pgs.

* cited by examiner

Primary Examiner — Faruk Hamza
Assistant Examiner — Diane Lo
(74) Attorney, Agent, or Firm — Schwegman, Lundberg & Woessner, P.A.

(57) ABSTRACT

Embodiments of a central controller and methods for interference mitigation in TDMA networks are generally described herein. In some embodiments, the central controller mitigates co-channel interference by randomizing locations of channel time allocations within superframes.

16 Claims, 4 Drawing Sheets

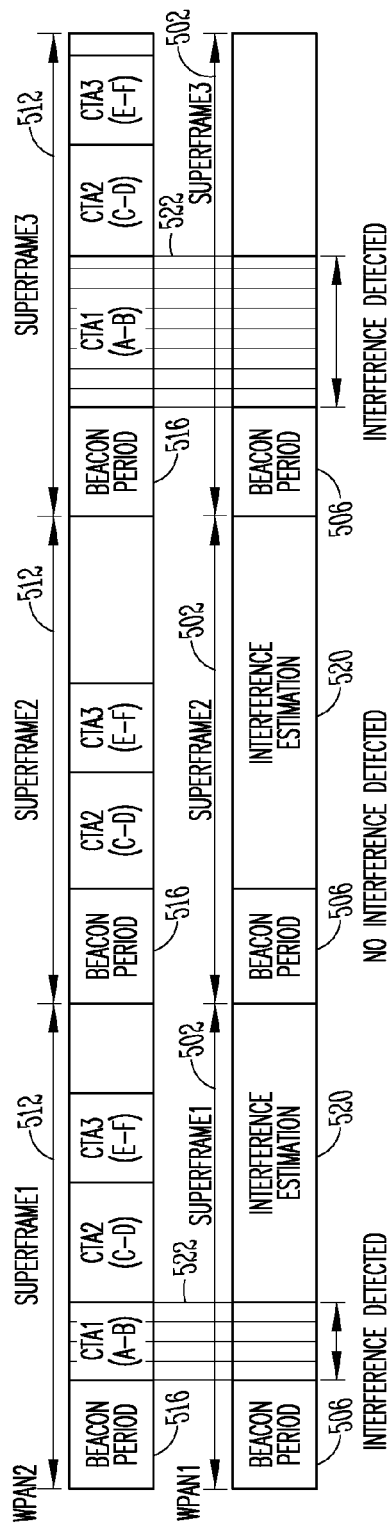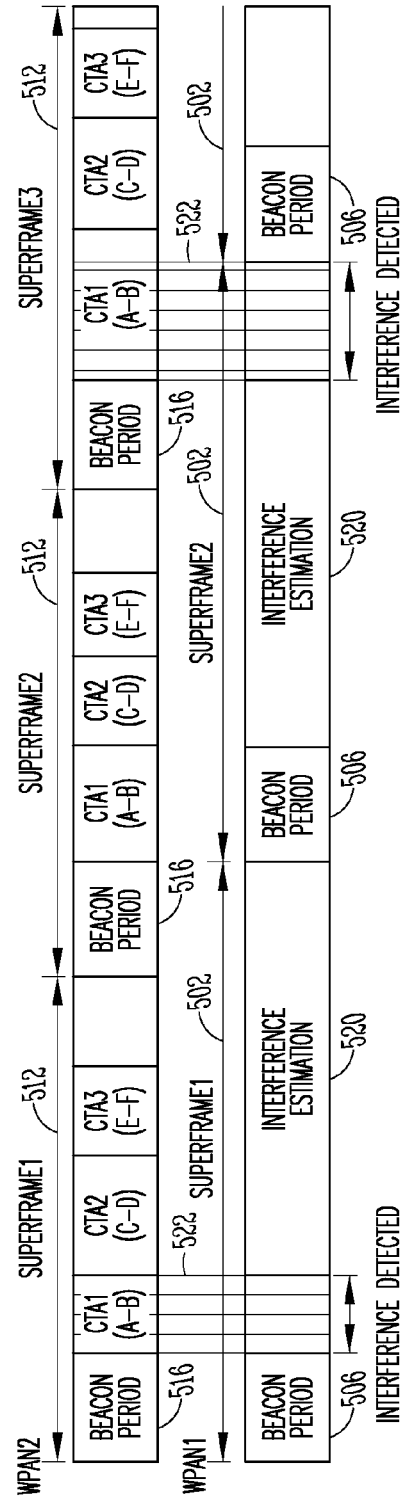
FIG. 5A
FIG. 5B

CENTRAL CONTROLLER AND METHODS FOR INTERFERENCE MITIGATION IN TDMA NETWORKS USING RANDOMLY ALLOCATED SERVICE PERIODS

TECHNICAL FIELD

Embodiments pertain to wireless networks that employ time-division multiple access (TDMA). Some embodiments pertain to wireless networks, such as Wireless Personal Area Networks (WPANs), which may use a central controller to coordinate communications between pairs of communication stations. Some embodiments pertain to wireless networks used to communicate audio-visual (A/V) including compressed video.

BACKGROUND

One issue with wireless networks that operate in an unlicensed portion of the frequency spectrum is interference from nearby wireless networks. For example, in the case of WPANs, such as WPANs that operate in accordance with the IEEE 802.15.3c standards, only a few channels are defined within in a limited bandwidth to support high data rate applications. The independent TDMA scheduling of service periods by each network may result in co-channel interference between the networks. Although the network devices can identify interference from neighboring networks and communicate during times that are free from interference, this process is time consuming and generally ineffective when the interference changes dynamically.

Thus, what are needed are wireless networks and methods that reduce the effects of interference from neighboring networks. What are also needed are methods of reducing the effects of co-channel interference in a WPAN operating in accordance with the IEEE 802.15.3c standards.

BRIEF DESCRIPTION OF THE DRAWINGS

FIG. 5A illustrates interference detection for TDMA networks in accordance with some embodiments with same-duration superframes; and FIG. 5B illustrates interference estimation for TDMA networks in accordance with some embodiments with different-duration superframes.

DETAILED DESCRIPTION

The following description and the drawings sufficiently illustrate specific embodiments to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for, those of other embodiments. Embodiments set forth in the claims encompass all available equivalents of those claims.

Figure 1:
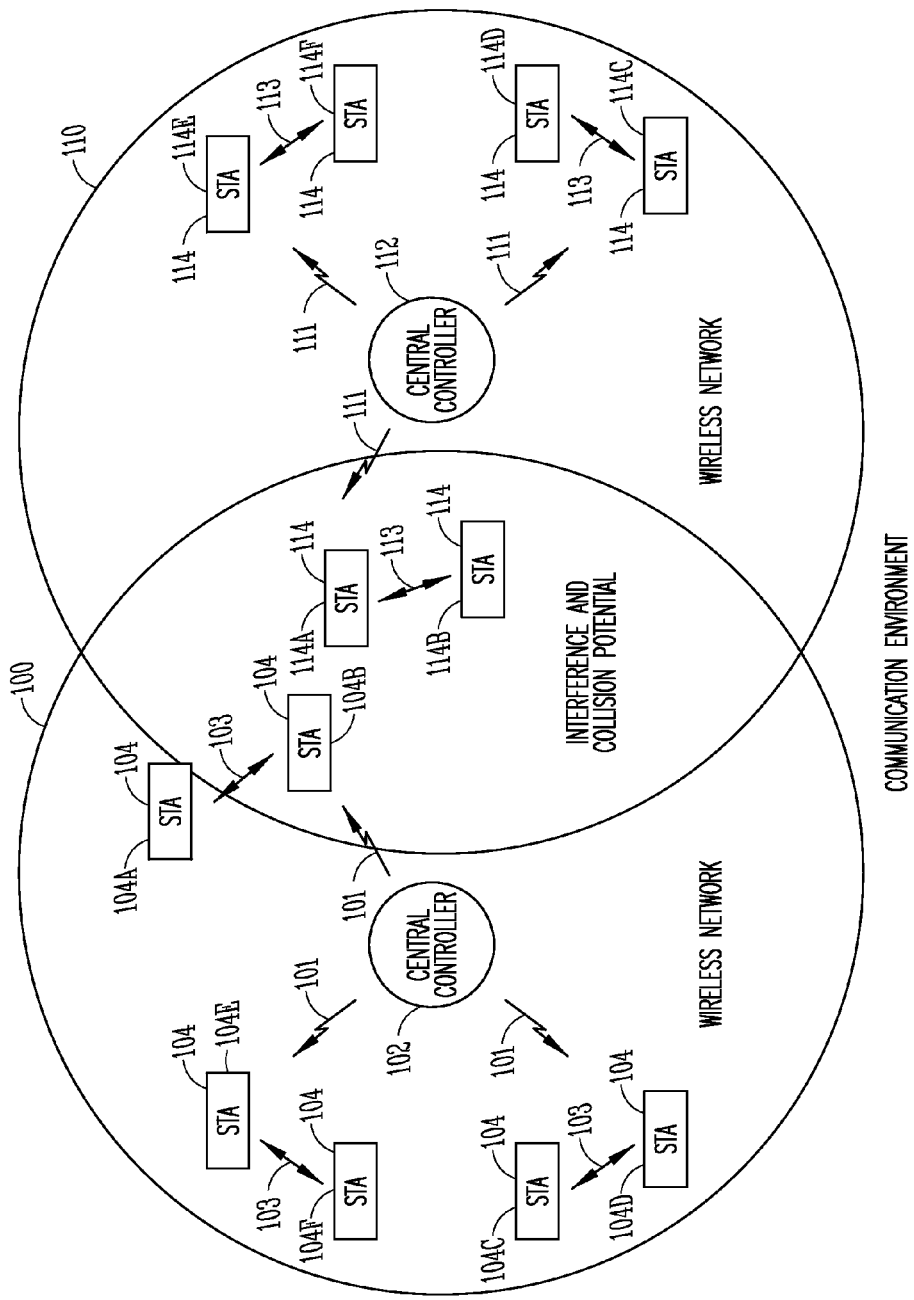
FIG. 1 illustrates a communication environment including nearby wireless networks in accordance with some embodiments.

FIG. 1 illustrates a communication environment including nearby wireless networks in accordance with some embodiments. The communication environment illustrated in FIG. 1 includes wireless network 100 and nearby wireless network 110. Both wireless networks 100 and 110 may employ TDMA, such as WPANs, and may operate in accordance with the IEEE 802.15.3c standards, although the scope of the embodiments is not limited in this respect. In some embodiments, wireless network 100 and wireless network 110 may utilize the same unlicensed frequency spectrum, such as the 60 GHz unlicensed frequency spectrum, although the scope of the embodiments is not limited in this respect.

Wireless network 100 may include central controller 102 to coordinate the operations of wireless network 100. Communication stations 104, designated individually as communication station 104A through 104F, of wireless network 100 may be assigned channel-time allocations (CTAs) 103 within superframes for peer-to-peer communications with another communication station 104. In addition to assigning time for communication between communication stations 104, central controller 102 may support isochronous traffics, maintain network synchronization time, and perform admission control. This allows the wireless resource to be shared among communication stations 104. In these embodiments, central controller 102 may assign a first CTA of a superframe for communication stations 104A and 104B to communicate, may assign a second CTA of the superframe for communication stations 104C and 104D to communicate, and may assign a third CTA of the superframe for communication stations 104E and 104F to communicate. Central controller 102 may also manage the QoS requirements of wireless network 100.

Similarly, wireless network 110 may include central controller 112 to coordinate the operations of wireless network 110. Communication stations 114, designated individually as communication stations 114A through 114F, of wireless network 110 may also be assigned CTAs 113 within superframes for peer-to-peer communications with another communication station 114 of network 110. In some embodiments, central controller 112 may assign a first CTA 113 of a superframe for communication stations 114A and 114B to communicate, may assign a second CTA 113 of the superframe for communication stations 114C and 114D to communicate, and may assign a third CTA 113 of the superframe for communication stations 114E and 114F to communicate.

This independent scheduling by wireless network 100 and wireless network 110 may result in interference between the communication stations of one network that are close to the communication stations of the other network since the networks share the same unlicensed frequency spectrum. For example, the communications of communication stations 104A and 104B of wireless network 100 may interfere or collide with the communications of communication stations 114A and 114B of wireless network 110.

In accordance with embodiments, central controller 102 may randomize locations of the CTAs 103 within superframes to help avoid co-channel interference from one or more neighboring networks. In this way, the effect of interference from neighboring co-channel wireless networks is migrated by spreading interference across multiple superframes. In some embodiments, an interference estimation process may be utilized, although this is not a requirement. These embodiments are discussed in more detail below.

Central controller 102 of wireless network 100 may transmit information within beacon periods 101 to communication stations 104 to allow communication station 104 to determine the randomized locations of the CTAs 103 within a superframe. Central controller 112 of wireless network 110 may also transmit information within beacon periods 111 to communication stations 114 to allow communication stations 114 to determine the randomized locations of the CTAs 113 within a superframe, however there is no requirement that both wireless networks 100 and 110 randomized locations of their CTAs. These embodiments are discussed in more detail below.

Co-channel interference is particularly an issue in a dense networking environment with multiple networks nearby each other. Current channelization in the IEEE 802.15.3c standard for WPANs define only 3 to 4 channels using approximately 2 GHz bandwidth to support high data rate applications. Since communications between neighboring WPANs is not addressed, the small number of available channels and the independent TDMA scheduling of service periods results in interference between neighboring WPANs. This co-channel interference problem gets even worse when WPANs that are based on different standards (heterogeneous WPANs) coexist in the same vicinity. Although a WPAN can estimate interference from neighboring WPANs to find an interference-free period for communications, interference estimation is a time consuming process and is effective when traffic of the neighboring WPANs lasts for a relatively long period of time. Furthermore, interference estimation becomes inefficient when traffic of neighboring WPANs changes dynamically (e.g., variable bit rate (VBR) traffic such as compressed video) or when the slots used by a neighboring WPAN changes in response to interference from a third WPAN.

Although WPANs are used to convey information over relatively short distances, the scope of the embodiments is not limited in this respect as embodiments are equally applicable to networks that communicate over greater distances. Although some embodiments described herein with respect to WPANs, the scope of the embodiments is not limited in this respect as embodiments are applicable to almost any TDMA network that uses a centralized service period allocation scheme. In some embodiments, central controller 102, as well as central controller 112, may be a Pico-Net controller (PNC), although the scope of the embodiments is not limited in this respect.

Figure 2:
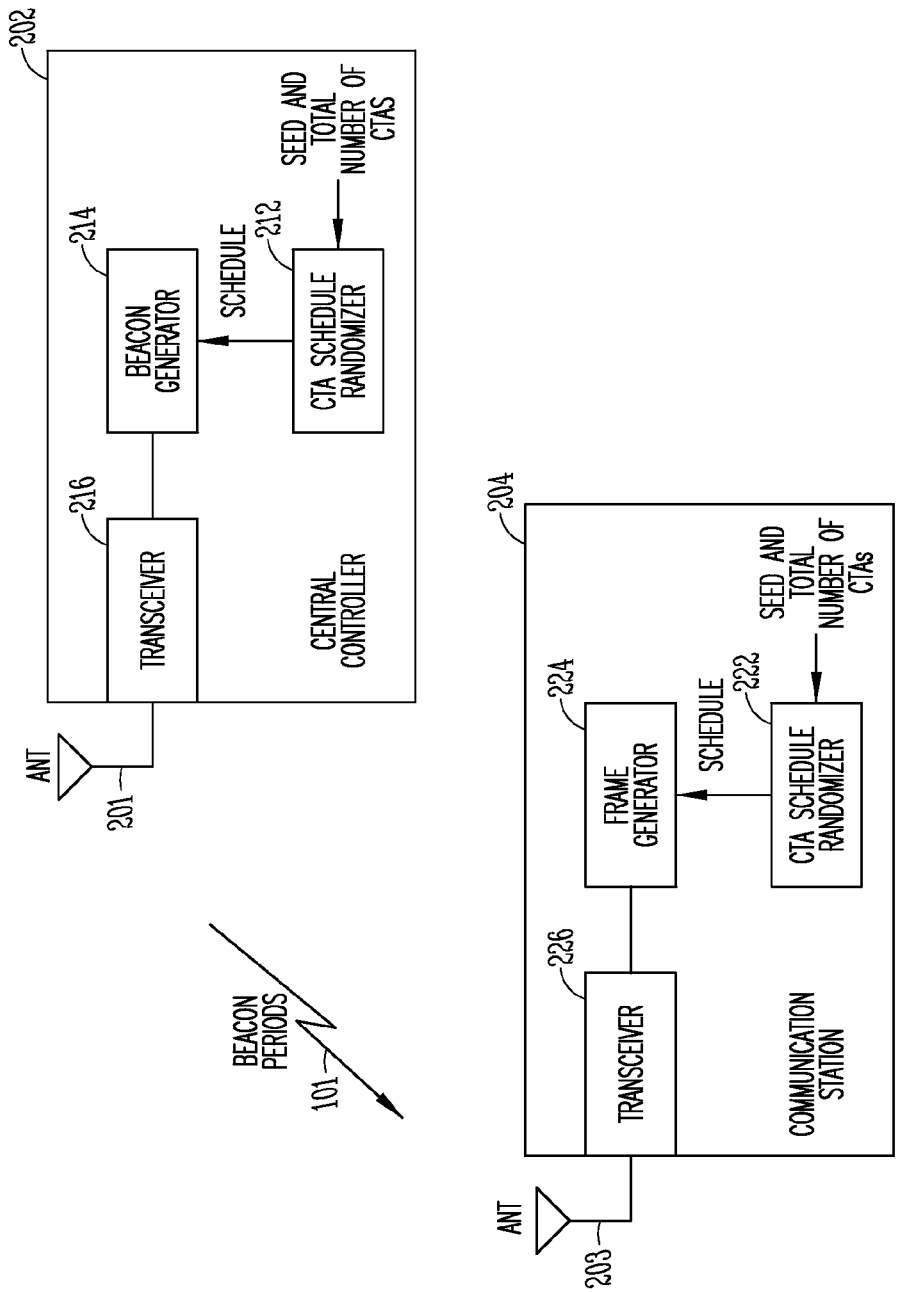
FIG. 2 illustrates functional block diagrams of a central controller and a communication station in accordance with some embodiments.

FIG. 2 illustrates functional block diagrams of a central controller and a communication station in accordance with some embodiments. Central controller 202 may be suitable for use as central controller 102 (FIG. 1) and/or central controller 112 (FIG. 1), and communication station 204 may be suitable for use as any of communications 104 (FIG. 1) and/or communication stations 114 (FIG. 1).

Central controller 202 may include transceiver 216 to receive and transmit information using one or more antennas 201 to communication stations within its network, such as communication station 204. Central controller 202 may also include beacon generator 214 to generate signals for transmission within beacon periods 101 to communication stations within its network. Central controller 202 may also include CTA schedule randomizer 212 to randomize locations of CTAs within superframes.

CTA schedule randomizer 212 may provide a schedule of the locations of randomly allocated CTAs, although the scope of the embodiments is not limited in this respect. The schedule may be transmitted within one or more of beacon periods 101 for receipt by the communication stations of the network. CTA schedule randomizer 212 may alternatively use a randomization seed and the number of CTAs to be allocated within a superframe to determine a starting CTA within a superframe. The starting CTA may be provided in one of beacon periods 101 and the communication stations may determine the locations of the CTAs within a superframe based on the starting CTA. Alternatively, the randomization seed and number of CTAs may be provided in one of beacon periods 101 to allow the communication stations to determine the starting CTA. These embodiments are discussed in more detail below.

Communication station 204 may include transceiver 226 for receiving communications from central controller 202 within beacon periods 101 and for communicating with other communication of the network. Communication station 224 may also include frame generator 224 for generating frames for use in communicating with other communication stations of the network. The frames may comprise superframes which may include a number of CTAs, as described in more detail below. Communication station 224 may also include CTA schedule randomizer 222 which may generate a schedule for the locations of allocated CTAs as indicated by central controller 202. Central controller 202 may provide a randomization seed and the number of CTAs for use by CTA schedule randomizer 222. Alternatively, central controller 202 may provide a randomized schedule of CTAs. These embodiments are discussed in more detail below.

Antennas 201 used by central controller 202 may comprise one or more omnidirectional antennas to allow central controller 202 to communicate with several communication stations located in various directions with respect to central controller. Antennas 201 may comprise several directional antennas.

Antennas 203 used by communication station 204 may comprise one or more omnidirectional antennas. Alternatively, antennas 203 may comprise one or more directional antennas that may be receive communications from central controller 202 and may direct their communications toward another communication station. Beamforming, antenna steering and phased array type antennas may be used to provide increased directivity between pairs of communication stations, although the scope of the embodiments is not limited in this respect.

Although central controller 202 and communication station 204 are illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, these may refer to one or more processes operating on one or more processing elements. Central controller 202 and communication station 204 may include additional functional elements not illustrated.

Figure 3:
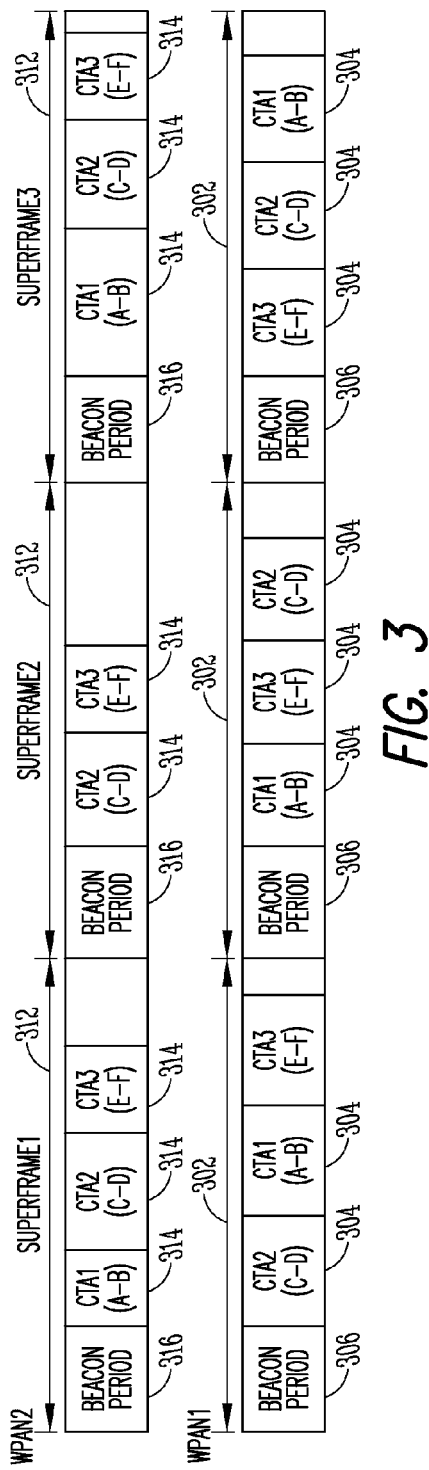
FIG. 3 illustrates channel-time-allocation (CTA) randomization in accordance with some embodiments.

FIG. 3 illustrates CTA randomization in accordance with some embodiments. As illustrated in FIG. 3, wireless network 100 (FIG. 1), designated as WPAN1, may use superframes 302 for allocating CTAs 304 to communication stations 104, and wireless network 110 (FIG. 1), designated as WPAN2, may use superframes 312 for allocating CTAs 314 to communication stations 114. Each of superframes 302 may include beacon period 306 and several CTAs 304, and each of superframes 312 may include beacon period 316 and several CTAs 314.

Referring to FIGS. 1 through 3, in accordance with some embodiments, central controller 102 coordinates operations of wireless network 100 by allocating CTAs 304 for peer-topeer communications between pairs of communication stations 104. In these embodiments, central controller 102 may randomize locations of CTAs 304 within superframes 302 to mitigate co-channel interference from neighboring wireless networks, such as wireless network 110. In these embodiments, the randomization of the locations of CTAs 304 within superframes 302 may help mitigate co-channel interference with nearby wireless networks. A nearby wireless network, such as wireless network 110 may or may not implement an interference mitigation technique. In some embodiments, central controller 102 may include CTA schedule randomizer 212 to randomize locations of the CTAs 304 within superframes 302.

CTAs 304 may comprise one or more sequential time slots within superframes 302. In some applications, CTAs 304 may be service periods (SPs) and superframes 302 may be beacon intervals, although the scope of the embodiments is not limited in this respect.

For wireless network 100, as illustrated in FIG. 3, CTA1 304 may be assigned to communication stations 104A and 104B, CTA2 304 may be assigned to communication stations 104C and 104D, and CTA3 304 may be assigned to communication stations 104E and 104F. For wireless network 110, as illustrated in FIG. 3, CTA1 314 may be assigned to communication stations 114A and 114B, CTA2 314 may be assigned to communication stations 114C and 114D, and CTA3 314 ma be assigned to communication stations 114E and 114F.

In accordance with some embodiments, central controller 102 may implement a basic randomization scheme. In these embodiments, central controller 102 may provide locations of randomly allocated CTAs 304 within beacon period 306 for receipt by communication stations 104 of wireless network 100. Beacon period 306 may be an initial time period of superframes 302 and identifies the locations of CTAs 304 within a subsequent one or more of superframes 302. The locations (i.e., the order) of CTAs 304 within one or more subsequent superframes 302 may be selected randomly by CTA schedule randomizer 212 of central controller 102. In these embodiments, beacon period 306 may be transmitted by central controller 102 at the beginning of each of superframes 302 and the locations of the CTAs assigned to station-pairs (i.e., 104A and 104B) are randomized in the next superframe. The locations of the CTAs 304 may be transmitted to each of the communication stations 104 operating under control of central controller 102 within beacon period 306.

In accordance with some other embodiments, central controller 102 may generate and use a randomization seed for randomizing locations of CTAs 304 within one or more of superframes 302. Central controller 102 may generate a randomization seed. A starting CTA within one of superframes 302 may be calculated based on the randomization seed. The starting CTA may correspond to a pseudorandom number calculated based on the seed value and a number of CTAs to be allocated in a next superframe using a modulo operation. CTAs 304 may be assigned in a predetermined order within the next superframe starting with the starting CTA.

In some embodiments, CTA schedule randomizer 212 may generate the randomization seed and calculate the starting CTA. When CTAs 304 are assigned in a predetermined order, the order may be sequential. For example, in these embodiments, if the starting CTA is CTA4, the CTAs may be assigned sequentially within the next superframe starting with CTA4 and finishing with CTAs 1-CTA3.

In some of these embodiments, central controller 102 may calculate the starting CTA for a superframe using the seed value and the number of CTAs using a modulo operation. In these embodiments, central controller 102 may provide an indication of the starting CTA to communication stations 104 in beacon period 306 and communication stations 104 may determine locations of CTAs 304 within a next of superframes 302 based at least on the indication of the starting CTA provided by central controller 102. In these embodiments, central controller 102 may also provide an indication of the length (e.g., a number of time slots) of each CTA that will be allocated within the next superframe 302. This may allow each of communication stations 104 to determine the location of each CTA within the next superframe. In these embodiments, CTAs 304 may be assigned in a predetermined order within the next starting with the starting CTA.

In some embodiments, the starting CTA may be calculated as follows:

Starting_CTA=random(seed,$i$) modulo $N$, where random(seed, i) generates a pseudo-random number based on the value of the randomization seed at every iteration and N is the total number of CTAs in a super frame. Because these embodiments use a modulo operation, they are very efficient to implement.

Central controller 102 may provide the randomization seed, the number of CTAs to be allocated within the next superframe, and an indication of the length of each of the CTAs to communication stations 104 within beacon period 306. Each communication station 104 may calculate the starting CTA for a next superframe using the seed value and the number of CTAs using a modulo operation. Communication stations 104 may determine the locations of CTAs 304 within next superframe 302 based in the indication of lengths provided by central controller 102 and the predetermined order. CTAs 304 may be assigned in a predetermined order within the next starting with the starting CTA. The randomization seed, the number of CTAs, and the indication of the length of each of the CTA may be transmitted within beacon period 306 to each of communication stations 104 operating under control of central controller 102. In some embodiments, the predetermined order may be a sequential order beginning with the starting CTA. Each CTA may comprise one or more time slots. The number of time slots may correspond to the length of a CTA, although the scope of the embodiments is not limited in this respect.

For each superframe, each station may generate a pseudo-random number corresponding to the starting CTA based on the seed value and the number of CTAs to be allocated using a modulo operation. CTA schedule randomizer 212 may employ a random number generator which may be set to an initial state based on initial state information provided in the beacon period 306. Communication stations 104 do not need to rely on information received in the prior beacon period 306 to determine the location of their assigned CTA in superframes following the next superframe 302. Communication stations 104 may be configured to initialize or reset the random number generator prior to calculating the starting CTA.

The probability that two links will collide can be calculated as follows. Assuming that all the CTAs have the same time duration $T_{CTA}$ and assuming that the available time for CTA allocations in a superframe is $T_{SF}$, due to beacon synchronization, the probability that two CTAs will conflict can be expressed as:

$Pr$(collision in a superframe)=$p_c$=$T_{CTA}/T_{SF}$

The probability that there will be no collisions for n consecutive superframes can be expressed as:

$Pr$(no collisions for $n$ consecutive superframes)=$(1-p_c)^n$

As the duration of CTA decreases the collision probability decreases.

In some embodiments, central controller 102 may further randomize the CTAs 304 within a superframe by instructing communication stations 104 to cyclically rotate CTAs 304 from one superframe to a next superframe. These embodiments are discussed in more detail below.

Figure 4:
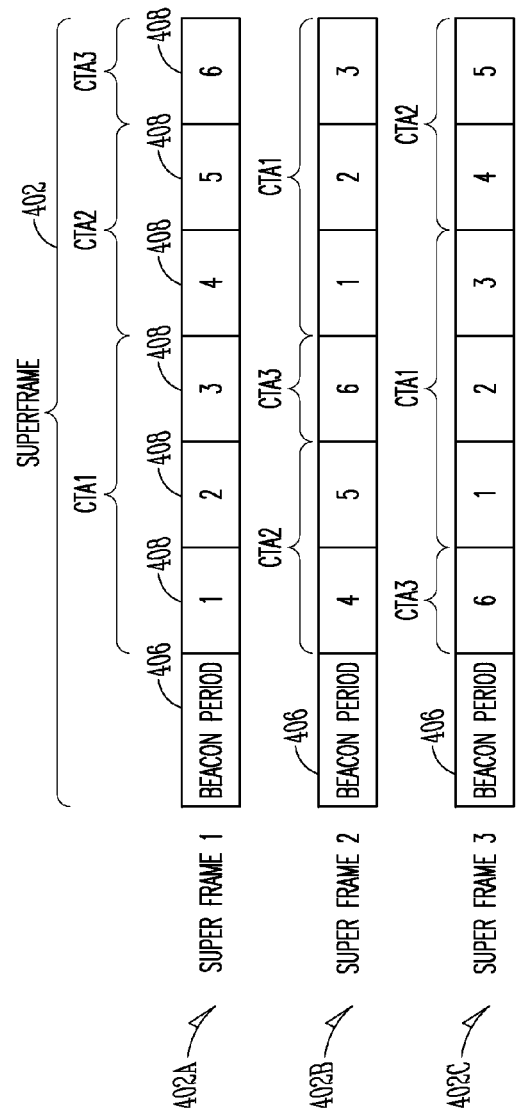
FIG. 4 illustrates cyclic shifting of time slots of CTAs in accordance with some alternate embodiments.

FIG. 4 illustrates cyclic shifting of time slots of CTAs in accordance with some alternate embodiments. FIG. 4 illustrates a plurality of sequential superframes 402, illustrated as 402A, 402B and 402C. In these embodiments, central controller 102 may provide an indication in beacon period 406 that time-slots 408 of CTAs within superframe 402 are to be cyclically rotated from one superframe 402A to a next superframe 402B. In the embodiments illustrated in FIG. 4, times slots of a CTA remain contiguous in each superframe 402. In these embodiments, communication stations 104 (FIG. 1) do not need to rely on information received in the prior beacon period 406 to determine the location of their assigned CTA in superframes following the next superframe 402.

In some embodiments, co-channel interference estimation may not be necessary. Central controller 102 (FIG. 1) may refrain from performing interference estimation to detect co-channel interference with nearby wireless networks when central controller 102 (FIG. 1) is configured to randomize the locations of the CTAs within superframes 402. Central controller 102 (FIG. 1) may instruct communication stations 104 (FIG. 1) within wireless network 100 (FIG. 1) to refrain from performing interference estimation when central controller 102 (FIG. 1) is to randomize the locations of CTAs within superframes 402. In these embodiments, interference estimation under IEEE 802.15.3c may not be performed.

In some alternate embodiments, interference estimation may be performed by central controller 102 (FIG. 1) and/or communication stations 104 (FIG. 1) to detect co-channel interference and determine whether the detected co-channel interference is static or dynamic. These embodiments are discussed in more detail below.

FIG. 5A illustrates interference estimation for TDMA networks in accordance with some embodiments with same-duration superframes. FIG. 5B illustrates interference estimation for TDMA networks in accordance with some embodiments with different-duration superframes.

As illustrated in FIGS. 5A and 5B, wireless network 100 (FIG. 1) is designated as WPAN1 and may use superframes 502, and wireless network 110 (FIG. 1) is designated as WPAN2, may use superframes 512 for allocating CTAs 514 to communication stations 114. Each superframe 502 may include beacon period 506, and each superframe 512 may include beacon period 516 and several CTAs 514. As illustrated in FIGS. 5A and 5B, wireless network 100 may perform interference estimation during portions 520 of superframes 502.

As illustrated in FIG. 5A, wireless network 100 (WPAN1) and wireless network 110 (WPAN2) may have superframes of the same duration. Wireless network 100 may detect interference 522 during CTA1 of wireless network 110. As illustrated, even though the superframes of the networks have the same duration, detected interference 522 does not necessarily repeat from superframe to superframe, nor does the detected interference 522 have the same length.

One reason that wireless network 100 detects interference 522 during CTA1 of wireless network 110 is that CTA1 is the service period that communication stations 114A and 114B communicate. As illustrated in FIG. 1, communication stations 114A and 114B are nearest central controller 102 and communication station 104A and 104B of wireless network 100. CTA2 and CTA3 of wireless network 110 are less likely to cause interference.

As illustrated in FIG. 5B, wireless network 100 (WPAN1) and wireless network 110 (WPAN2) may have superframes of different durations. Wireless network 100 may detect interference 522 during CTA1 of wireless network 110. As illustrated, detected interference 522 may occur in different locations of superframes 502

Detected interference 522 illustrated in FIGS. 5A and 5B are examples of dynamic interference because it is not predictable and does not occur on a regular or repeating basis. In accordance with some embodiments, central controller 102 may perform an interference estimation to detect co-channel interference with nearby wireless networks 110. When co-channel interference is detected from one or more neighboring wireless networks 110, central controller 102 may analyze the detected interference to determine whether the detected co-channel interference is static or dynamic. When central controller 102 determines that detected co-channel interference is static, central controller 102 may refrain from randomizing the locations of CTAs within superframes as discussed above, and may assign the CTAs to portions of a next superframe where the static co-channel interference is predicted not to be present. In these embodiments, static co-channel interference may be co-channel interference that is determined to occur on a regular or repeating basis (i.e., every so many seconds) allowing its time location in the near future to be predicted.

In these embodiments, when central controller 102 determines that the detected co-channel interference is dynamic, central controller 102 may inform the communication stations 104 that the locations of the CTAs are to be randomized within the superframes 302 in accordance with one of the embodiments discussed above. For example, the central controller 102 may provide the randomized locations of the CTAs to the communication stations 104 in beacon period 306, use a randomization seed to determine a starting CTA, or provide the randomization seed to the communication stations 104 in a beacon period 306 to allow the communication stations to determine the starting CTA. In these embodiments, dynamic co-channel interference 522 may be co-channel interference that does not occur on a regular or repeating basis (e.g., its location in the next superframe is unpredictable).

In some embodiments, communication stations 104 may perform an interference detection process to detect co-channel interference from one or more neighboring wireless networks 110. When communication stations 104 detect co-channel interference, the communication stations 104 may report the detected co-channel interference to central controller 102. Superframes 302 may include a contention access period not separately illustrated which may be used by communication station 104 to request assignment of CTAs as well as to report detected co-channel interference, although the scope of the embodiments is not limited in this respect. In some embodiments, central controller 102 may also or alternatively be configured to detect co-channel interference from one or more neighboring wireless networks.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, a computing device includes one or more processing elements coupled with computer-readable memory that may be volatile or nonvolatile memory or a combination thereof.

Embodiments may be implemented in one or a combination of hardware, firmware and software. Embodiments may also be implemented as instructions stored on a computer-readable medium, which may be read and executed by at least one processor to perform the operations described herein. A computer-readable medium may include any tangible medium for storing or transmitting information in a form readable by a machine (e.g., a computer). For example, a computer-readable medium may include read-only memory (ROM), random-access memory (RAM), magnetic disk storage media, optical storage media, flash-memory devices, and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A central controller to coordinate operations of a wireless network, the central controller comprising:
    a transceiver to transmit locations of allocated channel time allocations (CTAs) for peer-to-peer communications between pairs of communication stations of the wireless network; and
    a CTA schedule randomizer to randomize locations of the individual CTAs allocated to the pairs of stations within superframes to mitigate co-channel interference with neighboring wireless networks;
    wherein the transceiver is further configured to provide the locations of randomly allocated CTAs within a beacon period for receipt by the communication stations,
    wherein the beacon period is an initial time period of a superframe that identifies the locations of the CTAs within a subsequent one or more superframes;
    wherein the CTA schedule randomizer is further configured to generate a randomization seed,
    wherein a starting CTA corresponds to a pseudorandom number calculated based on a value of the randomization seed and a number of CTAs to be allocated in a next superframe,
    wherein the CTAs are assigned in a predetermined order within the next superframe beginning with the starting CTA;
    wherein the CTA schedule randomizer is configured to:
        calculate the starting CTA for the next superframe using the value of the randomization seed value and the number of CTAs using a modulo operation; and
        wherein the transceiver is configured to provide an indication of the starting CTA to the communication stations in a beacon period,
    wherein the communication stations are configured to determine the locations of the CTAs within the next superframe based at least on the indication of the starting CTA provided by the central controller.

2. The central controller of claim 1 wherein each CTA comprises one or more time-slots, and
    wherein the transceiver is further configured to provide an indication in the beacon period that the time-slots are to be cyclically rotated between the superframes.

3. The central controller of claim 1 wherein when the CTA schedule randomizer is configured to randomize the locations of the CTAs within the superframes, and
    wherein the transceiver is further configured to:
    refrain from performing interference estimation to detect the co-channel interference with nearby wireless networks; and
    instruct the communication stations of the wireless network to refrain from performing the interference estimation.

4. The central controller of claim 1 wherein when the transceiver is configured to perform an interference estimation to determine whether detected co-channel interference is static or dynamic,
    wherein when the transceiver determines that the detected co-channel interference is static, the CTA schedule randomizer is configured to:
        refrain from randomizing the locations of the CTAs within the CTA sections of the superframes; and
        assign the CTAs to portions of a next superframe where static co-channel interference is predicted not to be present.

5. The central controller of claim 4 wherein when the transceiver determines that the detected co-channel interference is dynamic, the transceiver is configured to inform the communication stations that the locations of the CTAs within the CTA sections of the superframes are to be randomized within the CTA sections of the superframes.

6. The central controller of claim 5 wherein when the communication stations are configured to perform an interference detection process to detect co-channel interference from one or more neighboring wireless networks, the communication stations are configured to report detected co-channel interference to the central controller,
    wherein the transceiver is to determine whether the detected co-channel interference reported by the communication stations is static or dynamic.

7. A method for mitigating co-channel interference in a wireless network, the method comprising at least partially randomizing locations of individual channel time allocations (CTAs) within superframes by a central controller,
    wherein pairs of communication stations of the wireless network communicate during the individual CTAs; further comprising transmitting the locations of randomly allocated CTAs within a beacon period for receipt by the communication stations,
    wherein the beacon period is an initial time period of a superframe that identifies the locations of the CTAs within the CTA sections of a subsequent one or more superframes; further comprising:
    generating a randomization seed,
    wherein a starting CTA corresponds to a pseudorandom number calculated based on a value of the randomization seed and a number of CTAs to be allocated in a next superframe,
    wherein the CTAs are assigned in a predetermined order within the CTA sections of the next superframe beginning with the starting CTA;
    further comprising calculating the starting CTA for the next superframe using the value of the randomization seed value and the number of CTAs using a modulo operation; and
    further comprising providing an indication of the starting CTA to the communication stations in a beacon period,
    wherein the communication stations are configured to determine the locations of the CTAs within the CTA section of the next superframe based at least on the indication of the starting CTA provided by the central controller.

8. The method of claim 7 further comprising transmitting the randomization seed, the number of CTAs to be allocated within the next superframe, and an indication of a length of each of the CTAs within a beacon period,
wherein the communication stations are each configured to:
calculate the starting CTA for the next superframe using the value of the randomization seed and the number of CTAs using a modulo operation; and
determine the locations of the CTAs within the CTA section of the next superframe based on the starting CTA, the indications of the lengths provided by the central controller, and the predetermined order.

9. The method of claim 8 wherein each CTA comprises one or more time-slots, and
wherein the method further comprises transmitting an indication in the beacon period that the time-slots are to be cyclically rotated between superframes.

10. The method of claim 7 wherein when the central controller is configured to randomize the locations of the CTAs within the CTA sections of the superframes, the method further comprises:
refraining from performing interference estimation to detect co-channel interference with nearby wireless networks; and
instructing the communication stations of the wireless network to refrain from performing interference estimation.

11. The method of claim 7 further comprising performing an interference estimation process to determine whether detected co-channel interference is static or dynamic,
wherein the detected co-channel interference is static, the method comprises:
refraining from randomizing the locations of the CTAs within the CTA sections of the superframes; and
assigning the CTAs to portions of a next superframe where static co-channel interference is predicted not to be present.

12. The method of claim 11 wherein when the detected co-channel interference is dynamic, the method comprises informing the communication stations that the locations of the CTAs are to be randomized within the CTA sections of the superframes.

13. A wireless communication device to operate within a wireless personal area network (WPAN), the wireless communication device comprising:
a transceiver to receive an indication within a beacon period from a central controller of the WPAN, the indication to indicate randomization of individual channel time allocations (CTAs) within a next superframe; and
a CTA schedule randomizer to generate a CTA schedule identifying locations of the individual CTAs within the CTA the sections of the next superframe based on the indication provided in the beacon period,
wherein the transceiver is configured to communicate with another wireless communication device during an assigned CTA in accordance with the CTA schedule;
further wherein the transceiver is configured to receive a randomization seed, a number of CTAs to be allocated within the next superframe, and an indication of a length of each of the CTAs within the beacon period, and
further wherein the wireless communication device is configured to:
calculate a starting CTA for the next superframe using a value of the randomization seed and the number of CTAs using a modulo operation; and
determine the locations of the CTAs within the CTA section of the next superframe based on the starting CTA, the indications of the lengths provided by the central controller, and a predetermined order.

14. The wireless communication device of claim 13 wherein the transceiver is configured to perform an interference detection process to detect co-channel interference from one or more neighboring WPANs and to report detected co-channel interference to the central controller,
wherein the central controller is to determine whether the detected co-channel interference reported by the wireless communication device is static or dynamic and provide the indication to indicate randomization of CTAs within the CTA sections of superframes when dynamic co-channel interference is reported.

15. A central controller for a wireless personal area network (WPAN) comprising:
a transceiver to perform interference estimation to determine whether detected co-channel interference is static or dynamic,
wherein when dynamic co-channel interference is detected, the transceiver is configured to inform communication stations of the WPAN that the locations of individual channel time allocations (CTAs) within superframes are to be randomized; further wherein
the central controller is further configured to generate a randomization seed,
wherein a starting CTA for a next superframe corresponds to a pseudorandom number calculated based on a value of the randomization seed and a number of CTAs to be allocated in a next superframe is determined using a modulo operation,
wherein the CTAs are assigned in a predetermined order within the CTA section of the next superframe beginning with the starting CTA,
wherein the transceiver is configured to provide an indication of the starting CTA to the communication stations in a beacon period, and
wherein the communication stations are configured to determine the locations of the CTAs within the next superframe based at least on the indication of the starting CTA provided by the central controller.

16. The central controller of claim 15 wherein when the central controller determines that the detected co-channel interference is static, the central controller is configured to:
refrain from randomizing the locations of the CTAs within the CTA sections of the superframes; and
assign the CTAs to portions of a next superframe where the static co-channel interference is predicted not to be present.

* * * * *